United States Patent [19]

Boon et al.

[11] 4,216,089

[45] Aug. 5, 1980

[54] WASTE WATER TREATMENT

[75] Inventors: Arthur G. Boon; Harold R. S. Page, both of Stevenage, England

[73] Assignee: Water Research Centre, England

[21] Appl. No.: 906,449

[22] Filed: May 17, 1978

[30] Foreign Application Priority Data

May 19, 1977 [GB] United Kingdom ............... 21190/77

[51] Int. Cl.$^2$ .......................... C02B 1/34; B01D 47/06
[52] U.S. Cl. ........................................ 210/63 R; 55/55
[58] Field of Search .......................... 210/15, 63 R, 170

[56] References Cited

U.S. PATENT DOCUMENTS

| | | | |
|---|---|---|---|
| 3,840,216 | 10/1974 | Smith et al. | 210/63 R |
| 3,939,066 | 2/1976 | Bauer | 210/15 X |
| 4,002,440 | 1/1977 | Saari | 55/55 X |
| 4,045,336 | 8/1977 | Isteri | 210/63 R |
| 4,115,258 | 9/1978 | Smith et al. | 210/63 R |

OTHER PUBLICATIONS

Howe, "A Low-Energy and Economical Superoxygenation Process," *Process Biochemistry,* Mar. 1977, pp. 32-33.

Bolton et al., "The ICI Deep Shaft Effluent Treatment Process and It's Potential for Large Sewage Works," Reprint from a Workshop on Large Wastewater Treatment Plants, Vienna, Austria, Sep. 1975.

*Primary Examiner*—Thomas G. Wyse
*Attorney, Agent, or Firm*—Jesse B. Grove, Jr.

[57] ABSTRACT

Gases are dissolved in aqueous liquids and sludges by employing the preliminary step of subjecting the liquids to a reduced pressure to remove incidental gases dissolved or contained therein, and then dissolving the required gases therein. The invention is of particular utility in the oxidative treatment of surface waters, waste waters or sewage, in which the latter are first de-gassed before being oxygenated. The degassing can be effected by, for example, using a siphon.

10 Claims, 4 Drawing Figures

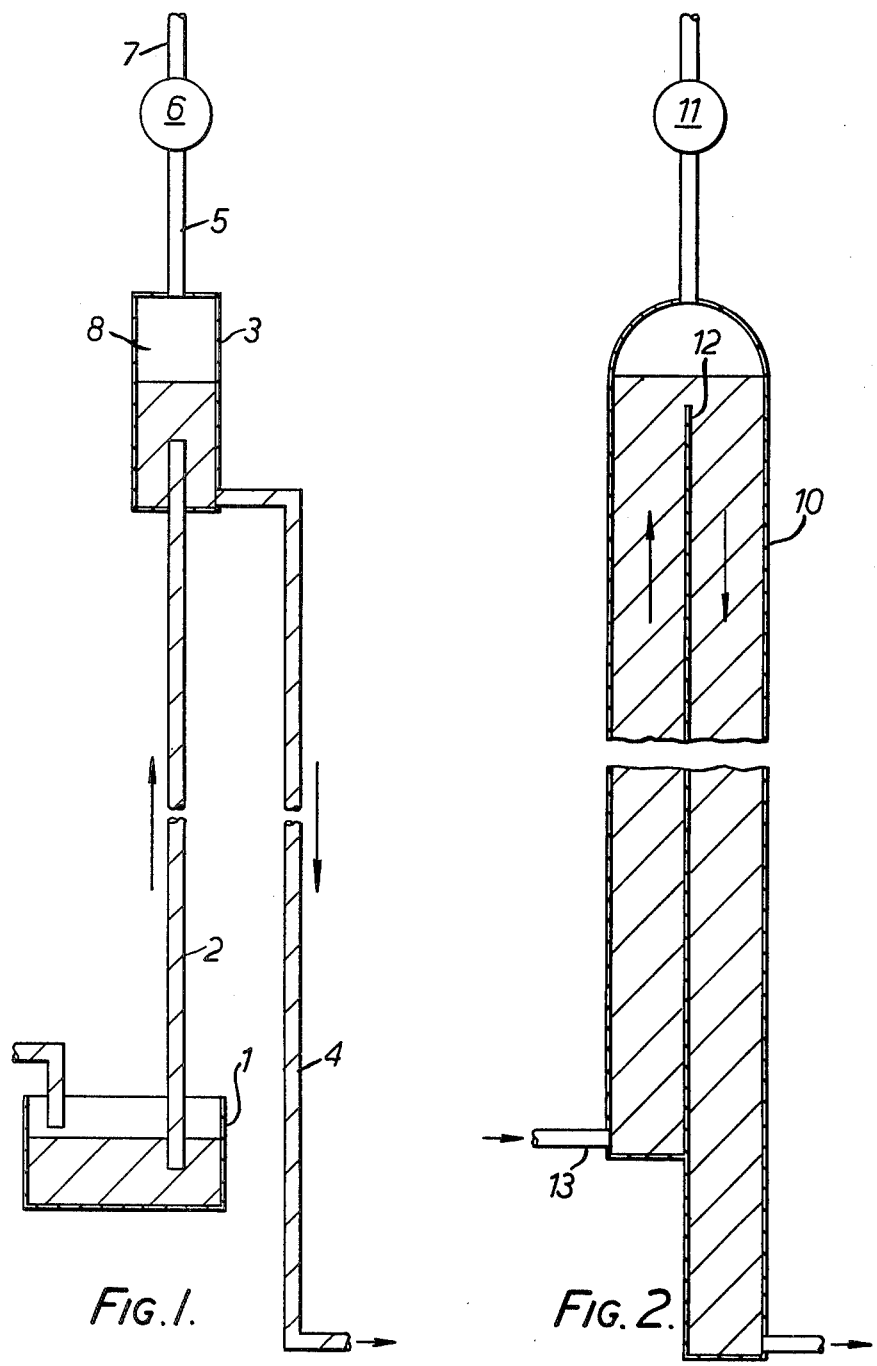

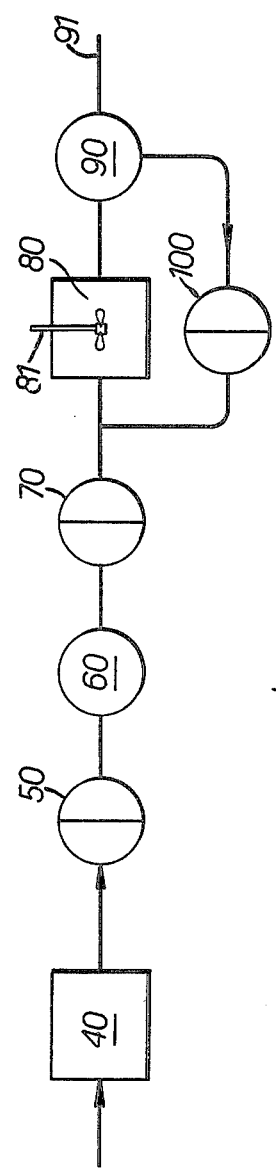
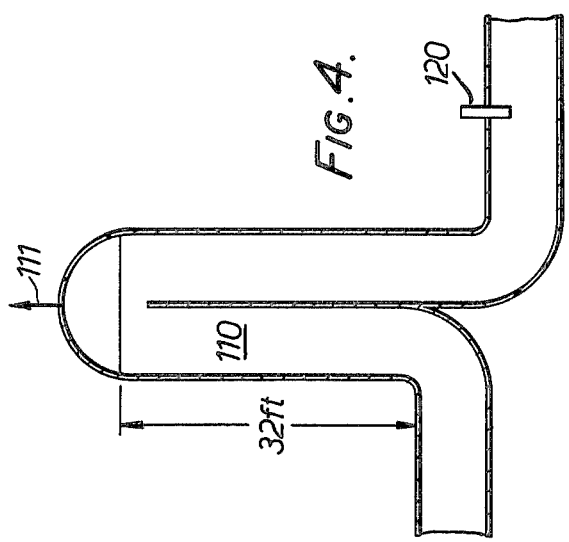

WASTE WATER TREATMENT

INTRODUCTION

This invention is concerned broadly with dissolving gases in aqueous liquids and, more particularly, with a preliminary treatment of the aqueous liquids to facilitate a subsequent gas dissolving step. The invention has particular utility in the treatment of waste waters or sludges, such as sewage, where oxygen is to be dissolved therein for the oxidation of carbonaceous and nitrogenous matter. According to the present invention, the dissolving of the oxygen is facilitated and rendered more efficient by utilising a preliminary treatment step.

BACKGROUND

In the known treatment of waste waters such as sewage to remove impurities therefrom by oxidative digestion, the sewage is aerated or oxygenated to promote the activity of micro-organisms therein which respire oxygen. It is desirable to maintain a relatively high dissolved oxygen (D.O.) concentration in the sewage and, in order better to achieve this, it is known to use an oxygen-enriched gas (for example commercial oxygen) instead of air. In practice, it is necessary to supply considerably more oxygen than can be dissolved in the sewage because the presence of dissolved $N_2$ prevents the maximum concentration of dissolved oxygen being achieved and this is wasteful of the oxygen.

It is also known to use an oxygen-enriched gas to prevent the formation of hydrogen sulphide in sewers, particularly rising main sewers (see Progress in Water Technology, Vol. 7 (1975) No. 2, pages 289-300). Again, in order to achieve the highest desirable D.O. concentration levels in the sewage, more oxygen has to be supplied than is actually taken up and used by the micro-organisms in the sewage, and this is wasteful.

As will be understood by those skilled in the art, oxygen-enriched gas is a fairly expensive commodity and its wastage in conventional sewage treatment processes as above described is disadvantageous.

Furthermore, in other fields gas wastages tend to arise in trying to maintain a high concentration of dissolved gas in an aqueous liquid.

OBJECTS OF THE INVENTION

It is an object of the present invention to provide a way of treating aqueous liquids whereby gases may be more efficiently dissolved therein, especially for example to a high concentration approaching or equal to the saturation value.

It is a further object of the invention to provide such a method which is particularly (but not exclusively) applicable to oxidation of sewage, other waste waters or sludge in treatment processes whereby more efficient use can be made of oxygen supplied to the process.

It is a further object of the invention to provide an efficient and economic method of effecting the said method.

THE INVENTION

According to the invention, an aqueous liquid in which a gas is to be dissolved is subjected to a preliminary treatment, prior to dissolving the said gas, wherein the aqueous liquid is exposed to a reduced pressure to cause gases, dissolved or otherwise contained therein, e.g. incidental gases previously dissolved or entrained therein, to be removed therefrom. By removing gases in this way, it is then possible thereafter to achieve more easily and more efficiently the desired dissolving of the required gas in the liquid, without using a large excess of the required gas and hence incurring significant wastage.

In a preferred aspect of the invention, there is provided in a method of oxygenating waste water or aqueous sludge for the oxidative treatment thereof, wherein an oxygen-containing gas is dissolved in the waste water or sludge and the so-treated water or sludge is thereafter subjected to oxidation, the improvement which comprises removing dissolved or entrained gases from the waste water or sludge, prior to dissolving the oxygen therein, by subjecting the waste water or sludge to a reduced pressure to cause gases entrained or dissolved therein to be released therefrom.

Waste waters such as sewage naturally contain gases (for example nitrogen, hydrogen sulphide and carbon dioxide) which may be dissolved and/or entrained therein. Some of these gases may have been generated in situ. The presence of these gases not only reduces the rate at which oxygen can be dissolved in the sewage, but also reduces the maximum D.O. concentration obtainable. In addition, the presence of dissolved carbon dioxide in sewage and recycled sludges lowers the pH value and this has the effect of suppressing the rate at which nitrification can be achieved in the activated sludge process, particularly where oxygen-enriched gas is used in place of air. Thus, the removal of these gases (preferably to as great an extent as possible) in accordance with the present invention, is particularly advantageous in the treatment of sewage.

It will be appreciated that in the overall treatment of sewage to render it safe and disposable, the raw sewage may be processed into one or more sludges and liquors, and that the preliminary desorption step of the invention is applicable at any one or more stages in the process prior to an oxygenation step.

In another preferred aspect of the invention, there is provided an improved method of treating sewage while it is being held in or is flowing through a sewer, in which method oxygen (by which term we include air and, more preferably, an oxygen-enriched gas) is injected into the sewage, the improvement comprising subjecting the sewage to a reduced pressure to remove unwanted gases therefrom prior to injecting the oxygen.

A further advantage of the preliminary de-gassing step of the present invention is that, after removal of a major proportion of unwanted gases, the oxygen subsequently injected may dissolve almost completely in the waste water so that (in contrast to prior known procedures) there is little, if any, undissolved gas in the waste water. In rising main sewers (force or pressure mains), this would minimise pressure increases which could otherwise occur because of the presence of entrained gases, and also increase the maximum D.O. concentration obtainable.

It will be appreciated that the step of removing gases from sewage will effect removal not only of "inert" gases such as nitrogen, but also of noxious and malodorous gases such as hydrogen sulphide. The removal of such gases under controlled conditions is, in itself, advantageous since it reduces corrosion and the risk of danger and inconvenience to personnel from the presence of those gases in the sewage and surrounding environment.

It will be appreciated that the preferred method of the invention, i.e. removal of gases from waste waters or sludges, is principally of advantage in connection with raw or partially treated waste waters or sludges, i.e. which require treatment or further treatment to render them safe or safely disposable. It is with such waste waters and sludges that the present invention provides substantial advantages.

The invention is applicable to substantially all waste waters and sludges (most especially of the type referred to above) including municipal and chemical waste waters and, for example, fermentation waste waters. It is also applicable, of course, in its broader aspects to any aqueous liquids in which it is desired to dissolve a gas, especially to dissolve a gas to a high concentration.

There are many ways in which the invention can be practised. With small quantities of waste water, for example, the waste water can be placed in a vessel from which air is then evacuated to reduce the pressure above the waste water surface. After sufficient time has elapsed for the desired quantity of gases to be removed, the vessel is returned to atmospheric pressure (internally) in the presence of oxygen enriched air or oxygen and the waste water released for oxidation to occur.

Where larger quantities of waste water are concerned, however, and where an inexpensive continuous operation is required, we prefer to pass the waste water through a siphon at the top of which a reduced pressure is maintained to desorb gases from the waste water passing through the siphon.

Two arrangements are shown schematically (in vertical section) and by way of illustration only in FIGS. 1 and 2, respectively, of the accompanying drawings. In FIG. 1, waste water is fed to a reservoir tank 1 from whence it passes up conduit 2 into vessel 3. From vessel 3, it exits via conduit 4 which terminates at a level below tank 1. Tank 3 includes a gas exit line 5 connected to a vacuum pump 6 having a vent 7.

In operation, conduits 2 and 4 and tank 1 operate as a siphon for the waste water, and once the siphon has been initiated, the waste water flows through the conduits 2 and 4, and tank 3, as shown. In the head space 8 in tank 3, the vacuum pump 6 maintains a reduced pressure and the gases desorbed from the waste water exit via line 5 and vent 7 (and may be analysed). The height of the water in the siphon can be up to the maximum attainable under prevailing atmospheric conditions and the vacuum pump can be operated at any pressure down to the minimum attainable. In practice, the operating conditions will depend on
(i) the flow rate of the waste water, which is dependent on its viscosity and on the dimensions of the conduits and the height of the siphon;
(ii) the amount of gas removed which depends inter alia on the height of the siphon, the gas solubility and the vacuum applied; and
(iii) the vapour pressure of the waste water at the prevailing temperature.

The arrangement in FIG. 2 is slightly different from that in FIG. 1, in that conduits 2 and 4 and tank 3 are replaced by a vertically mounted cylinder 10, closed at one end except for connection to a vacuum pump 11, and having a partition 12 located diametrically across the tube over a major part of the length of the tube. An inlet 13 for waste water is provided at the foot of the tube 10 on one side of the partition, and an outlet 14 is provided on the other side of the partition at a level below inlet 13 (to provide a siphon). The apparatus is operated in essentially the same way as that of FIG. 1.

In the method of the invention as applied to the oxygenation of waste water in a sewer (to prevent or reduce hydrogen sulphide formation and to treat partially the waste water), a siphon can be provided in or adjacent to the sewer, suitably at a sump or wet well, and the sewage passed therethrough (with desorption of gases) immediately prior to oxygenation.

FIG. 3 of the accompanying drawings shows schematically and by way of illustration only, a waste water treatment process embodying the invention as applied to sewage. FIG. 4 is a diagrammatic representation of a vertical elevation of the siphon and oxygen injection device 50 in FIG. 3.

Referring to FIG. 3, crude sewage is first subjected to conventional treatment involving screens and grit removal (40). The sewage is then subjected to a desorption step according to the invention, followed by oxygenation, in a device 50 (to be described in connection with FIG. 4). In device 50, gases are removed from the sewage which is then immediately oxygenated to a D.O. concentration of 40 to 50 mg/liter. The oxygenated sewage passes to a conventional primary sedimentation step 60 in which a primary sludge is separated from a liquor. The liquor from this step (D.O. concentration may be zero) is then passed through a desorption/oxygenation device 70 (same as device 50) to raise the D.O. concentration to 40 to 100 mg/liter. Biological oxidation takes place in tank 80 followed by a conventional secondary settlement step 90. Settled sludge is recirculated via a desorption/oxygenation device 100 (same as device 50) to the tank 80.

FIG. 4 shows a siphon 110 with an oxygen (i.e. oxygen-containing gas) injection device 120 immediately downstream thereof. This arrangement of FIG. 4 (in which the height of the water in the siphon can be up to the maximum attainable under prevailing atmospheric pressure) is the device 50, 70 and 100 referred to in FIG. 3.

By operating as described in FIG. 3, the overall efficiency of the process is improved over conventional treatment, in that the D.O. concentrations required are more easily and efficiently achieved.

It will be appreciated that an important area of use of the invention is in the pre-treatment of waste waters or sludges prior to an aeration or oxygenation step. Examples of this have been given above. A further example is in the re-aeration of surface waters such as river waters. Thus, the river water is first subjected to reduced pressure to desorb the gases therein, and is then oxygenated or aerated.

What is claimed is:

1. In a method for treating an aqueous liquid in which the liquid is subjected to a reduced pressure to remove dissolved and entrained undesirable gases therefrom, and a particular gas is then dissolved in the liquid, the improvement which comprises establishing siphonic flow in said liquid from a first level in a first container to a second lower level in a second container through a self-perpetuating siphon, thereby subjecting said liquid to reduced pressure, whereby gases dissolved and entrained in said liquid are released therefrom, the liquid flowing in said siphon upwardly in a first conduit from said first container to the top of the siphon and then downwardly in a second conduit to said second container; withdrawing said released gases from the top of the siphon, thereby preventing said gases from being carried downward by liquid flowing in said second conduit and from being redissolved in said liquid; and maintaining a reduced pressure at the top of said siphon to continue to release said gases at the top of said siphon to maintain the liquid flow through the siphon.

2. A method according to claim 1 wherein the aqueous liquid is waste water, sewage or sludge.

3. A method according to claim 2 wherein the particular gas comprises oxygen.

4. In a method of oxygenating waste water or aqueous sludge for the oxidative treatment thereof, wherein an oxygen-containing gas is dissolved in the waste water or sludge and the so-treated water or sludge is thereafter subjected to oxidation, and wherein dissolved or entrained gases are removed from the waste water or sludge, prior to dissolving the oxygen therein, by subjecting the waste or sludge to a reduced pressure to cause gases entrained or dissolved therein to be released therefrom, the improvement which comprises passing the waste water or sludge from a first level through a siphon to a second lower level, the siphon comprising an upstanding inverted U-shaped tube a first arm of which extends vertically upwards from said first level to the top of the siphon and the second arm of which extends downwardly from said top to said second level; maintaining a reduced pressure in the tube at a third level, the waste water or sludge flowing through the siphon under siphonic forces and being subjected to reduced pressure therein, whereby gases dissolved or entrained therein are released and removed therefrom; and withdrawing said released gases from the top of the siphon, thereby preventing said gases from being carried downward by liquid flowing in said second arm and from being redissolved in said liquid.

5. A method according to claim 4 wherein the height of the siphon is the maximum attainable for self-perpetuating siphonic flow in the prevailing atmospheric conditions.

6. A method according to claim 4 wherein the oxygen-containing gas consists of commercially pure oxygen.

7. A method according to claim 4 wherein the rate at which oxygen can be dissolved, and the maximum concentration of D.O. attainable, in the liquid are increased as a result of the release of the dissolved or entrained gases therefrom.

8. A method according to claim 4 wherein the oxygen-containing gas is dissolved in the waste water or sludge while it is in said second arm of the siphon.

9. A method according to claim 4 wherein the oxygen-containing gas is dissolved in the waste water immediately after it has left the siphon at said second level.

10. In a method for treating waste water such as sewage while it is being held in or is flowing through a sewer, wherein an oxygen-containing gas is injected into the waste water for the oxidative treatment thereof, the improvement which comprises subjecting the waste water to a reduced pressure to release and remove unwanted gases therefrom prior to injecting the oxygen-containing gas, wherein the waste water is subjected to reduced pressure by allowing it to flow under siphonic forces upward from a first level then downward to a second level through a siphon; and removing said released and unwanted gases from the uppermost point of flow of said waste water in said siphon, thereby preventing said gases from being carried downward by liquid flowing downward and from being redissolved in said liquid.

* * * * *